(12) United States Patent
Inagaki et al.

(10) Patent No.: US 10,317,853 B2
(45) Date of Patent: Jun. 11, 2019

(54) MACHINE LEARNING METHOD AND MACHINE LEARNING DEVICE FOR LEARNING FAULT CONDITIONS, AND FAULT PREDICTION DEVICE AND FAULT PREDICTION SYSTEM INCLUDING THE MACHINE LEARNING DEVICE

(71) Applicants: FANUC CORPORATION, Yamanashi (JP); Preferred Networks, Inc., Tokyo (JP)

(72) Inventors: Shougo Inagaki, Yamanashi (JP); Hiroshi Nakagawa, Yamanashi (JP); Daisuke Okanohara, Tokyo (JP); Ryosuke Okuta, Tokyo (JP); Eiichi Matsumoto, Tokyo (JP); Keigo Kawaai, Tokyo (JP)

(73) Assignees: FANUC CORPORATION, Yamanashi (JP); PREFERRED NETWORKS, INC., Tokyo (JP)

( * ) Notice: Subject to any disclaimer, the term of this patent is extended or adjusted under 35 U.S.C. 154(b) by 149 days.

(21) Appl. No.: 15/220,925

(22) Filed: Jul. 27, 2016

(65) Prior Publication Data
US 2017/0031329 A1 Feb. 2, 2017

(30) Foreign Application Priority Data

Jul. 31, 2015 (JP) ................................. 2015-152572
Nov. 30, 2015 (JP) ................................. 2015-234022

(51) Int. Cl.
*G05B 15/02* (2006.01)
*G05B 13/02* (2006.01)
(Continued)

(52) U.S. Cl.
CPC .......... *G05B 13/0265* (2013.01); *B25J 9/163* (2013.01); *G05B 15/02* (2013.01);
(Continued)

(58) Field of Classification Search
CPC ........... G05B 23/02; G06N 99/00; G06N 3/08
See application file for complete search history.

(56) References Cited

U.S. PATENT DOCUMENTS 6,216,048 B1 * 4/2001 Keeler ................. G05B 13/027
700/29
6,502,085 B1 * 12/2002 Adibhatla ............. G01M 15/00
706/20
(Continued)

FOREIGN PATENT DOCUMENTS

JP S63123105 A 5/1988
JP 8-263131 A 10/1996
(Continued)

*Primary Examiner* — Vincent H Tran
(74) *Attorney, Agent, or Firm* — Hauptman Ham, LLP

(57) ABSTRACT

A fault prediction system includes a machine learning device that learns conditions associated with a fault of an industrial machine. The machine learning device includes a state observation unit that, while the industrial machine is in operation or at rest, observes a state variable including, e.g., data output from a sensor, internal data of control software, or computational data obtained based on these data, a determination data obtaining unit that obtains determination data used to determine whether a fault has occurred in the industrial machine or the degree of fault, and a learning unit that learns the conditions associated with the fault of the industrial machine in accordance with a training data set generated based on a combination of the state variable and the determination data.

17 Claims, 6 Drawing Sheets

(51) Int. Cl.
  *G06N 20/00* (2019.01)
  *B25J 9/16* (2006.01)
  *G05B 19/4063* (2006.01)
  *G06N 3/04* (2006.01)
  *G06N 3/08* (2006.01)
  *G06N 5/04* (2006.01)
  *G05B 23/02* (2006.01)

(52) U.S. Cl.
  CPC ....... *G05B 19/4063* (2013.01); *G05B 23/024* (2013.01); *G06N 3/04* (2013.01); *G06N 3/08* (2013.01); *G06N 5/048* (2013.01); *G06N 20/00* (2019.01); *G05B 2219/31359* (2013.01); *G05B 2219/33321* (2013.01); *G06N 3/0445* (2013.01); *G06N 3/084* (2013.01); *Y02P 90/22* (2015.11); *Y10S 901/47* (2013.01)

(56) References Cited

U.S. PATENT DOCUMENTS

| | | | | |
|---|---|---|---|---|
| 9,792,656 | B1* | 10/2017 | Konrardy | G06Q 40/08 |
| 2001/0039481 | A1* | 11/2001 | Tremblay | C25B 15/02 |
| | | | | 702/35 |
| 2003/0149547 | A1 | 8/2003 | Nakao et al. | |
| 2007/0156620 | A1* | 7/2007 | Hartman | G05B 23/024 |
| | | | | 706/47 |
| 2007/0220368 | A1* | 9/2007 | Jaw | G05B 23/024 |
| | | | | 714/48 |
| 2010/0030521 | A1* | 2/2010 | Akhrarov | G06K 9/622 |
| | | | | 702/182 |
| 2010/0057649 | A1* | 3/2010 | Lee | H04L 41/0631 |
| | | | | 706/12 |
| 2010/0318837 | A1* | 12/2010 | Murphy | G06F 11/008 |
| | | | | 714/4.1 |
| 2012/0185728 | A1* | 7/2012 | Guo | F24F 11/0009 |
| | | | | 714/26 |
| 2013/0294938 | A1* | 11/2013 | Worden | F04B 25/00 |
| | | | | 417/53 |
| 2014/0365195 | A1* | 12/2014 | Lahiri | G06F 19/702 |
| | | | | 703/12 |
| 2015/0154062 | A1* | 6/2015 | Watanabe | G06F 11/0751 |
| | | | | 714/26 |
| 2016/0203036 | A1* | 7/2016 | Mezic | G06F 11/079 |
| | | | | 714/819 |
| 2017/0293862 | A1* | 10/2017 | Kamiya | G01M 15/02 |

FOREIGN PATENT DOCUMENTS

| | | |
|---|---|---|
| JP | H1039908 A | 2/1998 |
| JP | 2003-76414 A | 3/2003 |
| JP | 2014-96050 A | 5/2014 |
| JP | 5684941 B1 | 3/2015 |
| JP | 2015-88078 A | 5/2015 |

* cited by examiner (a)

(b)

(a)

(b)

(c)

MACHINE LEARNING METHOD AND MACHINE LEARNING DEVICE FOR LEARNING FAULT CONDITIONS, AND FAULT PREDICTION DEVICE AND FAULT PREDICTION SYSTEM INCLUDING THE MACHINE LEARNING DEVICE

RELATED APPLICATIONS

The present application claims priority to Japanese Patent Application Number 2015-152572, filed Jul. 31, 2015, and Japanese Patent Application Number 2015-234022, filed Nov. 30, 2015, the disclosure of which is hereby incorporated by reference herein in its entirety.

BACKGROUND OF THE INVENTION

1. Field of the Invention

The present invention relates to a machine learning method and a machine learning device for learning fault conditions, and a fault prediction device and a fault prediction system including the machine learning device.

2. Description of the Related Art

In an industrial machine, to improve the yield and prevent accidents, abnormality of any component may be detected in advance. For example, one known method compares the output value of a sensor with a predetermined threshold to detect an abnormality on the basis of the comparison result. An "industrial machine" herein refers to not only industrial robots and machines controlled by CNC (Computer Numerical Control) devices but also machines including service robots and various mechanical devices.

Japanese Laid-open Patent Publication No. S63(1988)-123105 discloses a fault prediction diagnosis method for comparing the operation pattern of a robot in operation with a reference operation pattern for the robot in the normal state to predict a fault of the robot.

Japanese Laid-open Patent Publication No. H10(1998)-039908 discloses a fault prediction method for comparing the difference between the load-side power based on the actual operation state of a drive shaft and the driving-side power based on an operation command issued to the drive shaft with a determination value to evaluate whether a robot mechanism portion has deteriorated and the level of deterioration.

Unfortunately, with greater complexity and sophistication of industrial machines, factors which lead to faults are becoming more complicated. Therefore, conventional fault prediction methods performed in accordance with a predetermined procedures are often inapplicable to actual circumstances or deficient in accuracy. This has triggered a demand for a fault prediction device capable of accurate fault prediction according to the circumstances involved.

SUMMARY OF INVENTION

According to a first aspect of the present invention, there is provided a machine learning device that learns a condition associated with a fault of an industrial machine, the device including a state observation unit that, while the industrial machine is in operation or at rest, observes a state variable comprising at least one of data output from a sensor that detects a state of one of the industrial machine and a surrounding environment, internal data of control software controlling the industrial machine, and computational data obtained based on one of the output data and the internal data; a determination data obtaining unit that obtains determination data used to determine one of whether a fault has occurred in the industrial machine and a degree of fault; and a learning unit that learns the condition associated with the fault of the industrial machine in accordance with a training data set generated based on a combination of the state variable and the determination data.

According to a second aspect of the present invention, in the first aspect, the learning unit may be configured to learn the condition in accordance with the training data set generated for each of a plurality of industrial machines.

According to a third aspect of the present invention, in the first and second aspects, the learning unit may learn a normal state only in a predetermined period and then detects occurrence of a fault determined by the determination data obtaining unit.

According to a fourth aspect of the present invention, in any one of the first to third aspects, when the determination data obtaining unit obtains determination data indicating a fault of the industrial machine, the learning unit may update the condition by weighting the determination data comprised in the training data set, in accordance with a length of time from when the determination data is obtained until a fault occurs.

According to a fifth aspect of the present invention, there is provided a fault prediction device that includes the machine learning device according to any one of the first to fourth aspects and predicts a fault of the industrial machine, the fault prediction device further including a fault information output unit that outputs fault information indicating one of whether a fault has occurred in the industrial machine and a degree of fault, in response to input of a current state variable of the state variable, based on a result of learning by the learning unit in accordance with the training data set.

According to a sixth aspect of the present invention, in the fifth aspect, the learning unit may learn the condition again in accordance with an additional training data set generated based on a combination of the current state variable and the determination data.

According to a seventh aspect of the present invention, in the fifth or sixth aspect, the machine learning device may be connected to the industrial machine via a network, and the state observation unit may obtain the current state variable via the network.

According to an eighth aspect of the present invention, in the seventh aspect, the machine learning device may be located on a cloud server.

According to a ninth aspect of the present invention, in any one of the fifth to eighth aspects, the machine learning device may be mounted in a controller that controls the industrial machine.

According to a tenth aspect of the present invention, in any one of the fifth to ninth aspects, the industrial machine may include a plurality of industrial machines, and the learning result obtained by the machine learning device may be shared by the plurality of industrial machines.

According to an eleventh aspect of the present invention, there is provided a fault prediction system including the fault prediction device according to any one of the fifth to tenth aspects; a sensor that outputs the output data; and a fault information notifying unit that notifies an operator of the fault information.

According to a twelfth aspect of the present invention, in the eleventh aspect, a time at that the fault information notifying unit notifies the operator of the fault information may satisfy at least one of precedence to a time defined by a first predetermined period preceding a time at that a fault occurs, and subsequence to a time defined by a second predetermined period preceding the time at that a fault occurs.

According to a thirteenth aspect of the present invention, there is provided a machine learning method for learning a condition associated with a fault of an industrial machine, the method including while the industrial machine is in operation or at rest, observing a state variable comprising at least one of data output from a sensor that detects a state of one of the industrial machine and a surrounding environment, internal data of control software controlling the industrial machine, and computational data obtained based on one of the output data and the internal data; obtaining determination data used to determine one of whether a fault has occurred in the industrial machine and a degree of fault; and learning the condition associated with the fault of the industrial machine in accordance with a training data set generated based on a combination of the state variable and the determination data.

BRIEF DESCRIPTION OF THE DRAWINGS

The present invention will be more clearly understood by reference to the accompanying drawings, in which.

DETAILED DESCRIPTION

Figure 1:
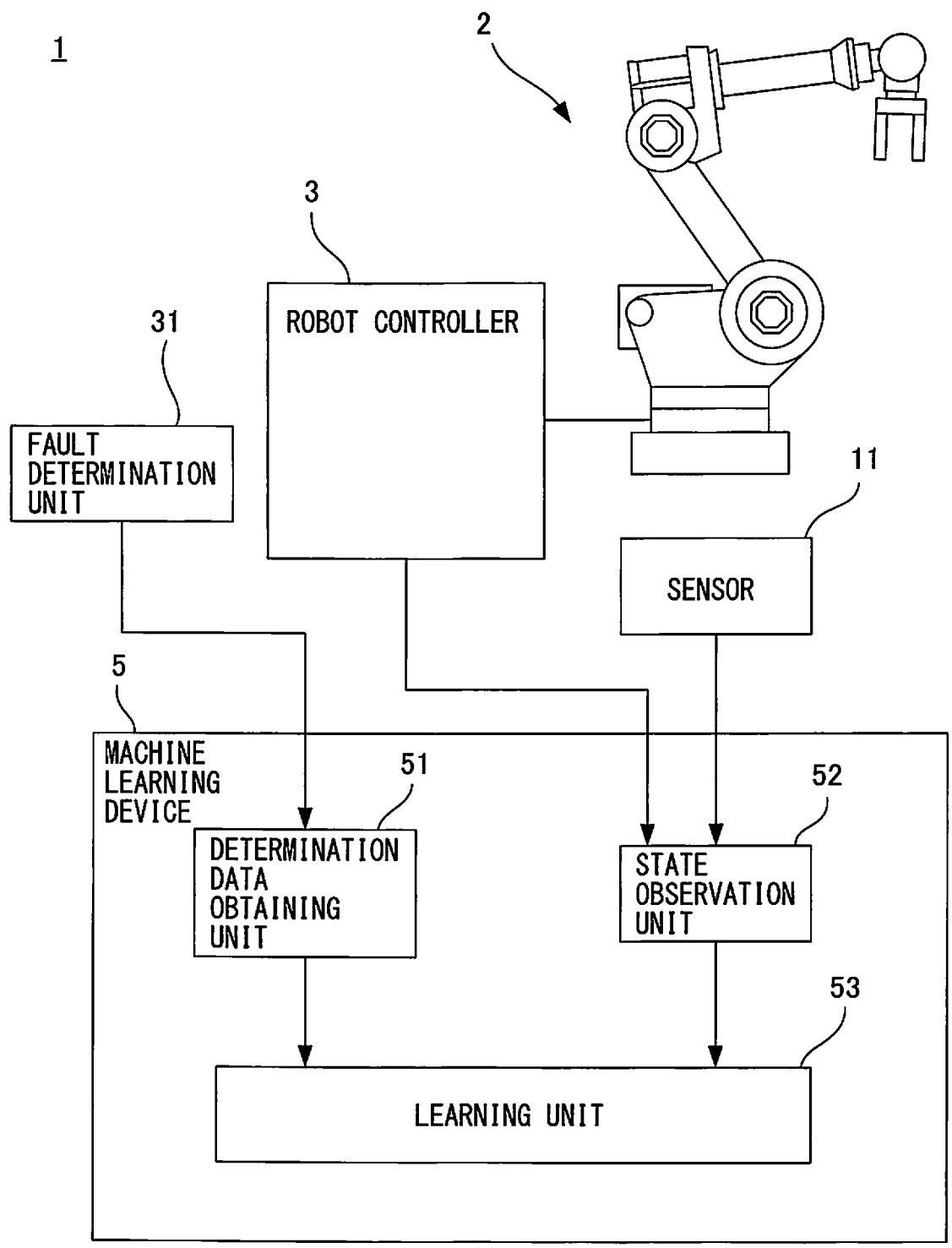
FIG. 1 is a block diagram illustrating an exemplary fault prediction system according to an embodiment.

Embodiments of a machine learning method and a machine learning device, and a fault prediction device and fault prediction system including the machine learning device according to the present invention will be described below with reference to the accompanying drawings. However, it is to be understood that the present invention is not limited to the drawings or the following embodiment. To foster better understanding of the present invention, components according to the embodiment are represented in the drawings in different scales as appropriate. The same reference numerals denote the same or corresponding components.

FIG. 1 is a block diagram illustrating an exemplary fault prediction system according to an embodiment. A fault prediction system 1 can learn conditions associated with a fault of an industrial machine (to be also referred to as "fault conditions" hereinafter) using a machine learning device 5 having the machine learning function. The fault prediction system 1 can generate fault information according to the state of the industrial machine or the environment surrounding it, based on the learning result obtained by the machine learning device 5.

In this specification, an "industrial machine" refers to various machines including industrial robots, service robots, and machines controlled by CNC (Computer Numerical Control) devices. Further, in this specification, a "fault of an industrial machine" includes faults of components constituting an industrial machine. In other words, a "fault of an industrial machine" is not limited to the state in which an intended function of an industrial machine may not be executable, but it includes, e.g., the state in which normal operation may be temporarily or permanently unreproducible.

"Fault information" generated by the fault prediction system 1 includes information indicating whether a fault has occurred in the industrial machine or information indicating the "degree of fault." The "fault information" may include information indicating that the industrial machine is in a normal state. The "degree of fault" refers to the fault seriousness. The "degree of fault" may have its maximum or minimum value limited. The "degree of fault" may be a continuous or discrete quantity. The operator can decide whether the target component is to be replaced or repaired immediately or in the next maintenance operation, in accordance with the "degree of fault."

The fault prediction system 1 used to predict a fault of a robot 2 will be described hereinafter. However, persons skilled in the art would recognize that the present invention may be similarly applicable to any other industrial machines.

The robot 2 illustrated as FIG. 1 is implemented in a six-axis vertical articulated robot with its respective joints driven by motors. The robot 2 is connected to a robot controller 3 via a known communication means. The robot controller 3 generates a command for the robot 2 in accordance with a control program.

The robot controller 3 is implemented in a digital computer including an interface connected to a CPU, a ROM, a RAM, a non-volatile memory, and an external device. The robot controller 3 includes a fault determination unit 31, as illustrated as FIG. 1.

The fault determination unit 31 determines a fault of the robot 2, using the known fault diagnosis method. The fault determination unit 31 determines whether a fault has occurred in the robot 2 or the degree of fault, independently of fault information generated by the fault prediction system 1. When, for example, a disturbance torque detected by a torque sensor or the amplitude of vibration of data output from a sensor exceeds a predetermined threshold, the fault determination unit 31 determines that a fault has occurred. Alternatively, the fault determination unit 31 may determine that a fault has occurred in the robot 2, based on internal data of control software stored in the robot controller 3. In this manner, the fault determination unit 31 determines faults based on various factors. The determination result obtained by the fault determination unit 31 is input to a determination data obtaining unit 51 of the machine learning device 5 (to be described later).

In another embodiment, the machine learning device 5 may be configured to discover a fault of the robot 2 or use the determination data obtaining unit 51 to receive fault information in response to the input operation by an identifiable operator.

The fault prediction system 1 further includes a sensor 11 which detects the state of the robot 2 or the surrounding environment. The sensor 11 may include at least one of a force sensor, a torque sensor, a vibration sensor, a sound collection sensor, an image sensor, a distance sensor, a temperature sensor, a humidity sensor, a flow sensor, a light quantity sensor, a pH sensor, a pressure sensor, a viscosity sensor, and an odor sensor. Data output from the sensor 11 (to be also simply referred to as "output data" hereinafter) is input to a state observation unit 52 of the machine learning device 5.

The machine learning device 5 learns the fault conditions of the robot 2. In an embodiment, the machine learning device 5 may be implemented in a digital computer which is connected to the robot 2 via a network and is independent of the robot controller 3.

In another embodiment, the machine learning device 5 may be built into the robot controller 3. In this case, the machine learning device 5 performs machine learning using the processor of the robot controller 3. In still another embodiment, the machine learning device 5 may be located on a cloud server.

The machine learning device 5 includes a determination data obtaining unit 51, a state observation unit 52, and a learning unit 53, as depicted as FIG. 1.

The determination data obtaining unit 51 obtains determination data from the fault determination unit 31. Determination data is input from the determination data obtaining unit 51 to the learning unit 53 and used by the machine learning device 5 to learn fault conditions. The determination data is defined as data used to determine whether a fault has occurred or the degree of fault. The determination data may include no data representing that a fault has occurred, i.e., that the robot 2 is in an abnormal state.

The state observation unit 52 observes a state variable as an input value for machine learning, while the robot 2 is in operation or at rest. In an embodiment in which the machine learning device 5 is connected to the robot 2 and the sensor 11 via a network, the state observation unit 52 obtains a state variable via the network.

The state variable may include data output from the sensor 11. The state variable may include internal data of control software controlling the robot 2. The internal data may include at least one of the torque, the position, the velocity, the acceleration, the jerk, the current, the voltage, and the estimated disturbance value. The estimated disturbance value is, for example, a disturbance value estimated by an observer based on a torque command and velocity feedback.

The state variable may include computational data obtained based on the output data or the internal data. The computational data may be obtained using at least one of frequency analysis, time-frequency analysis, and autocorrelation analysis. The computational data may be obtained using simpler computation such as coefficient multiplication or differential and integral operation, as a matter of course.

The learning unit 53 learns fault conditions in accordance with a training data set generated based on a combination of the state variable output from the state observation unit 52 and the determination data output from the determination data obtaining unit 51. The training data set is data associating the state variable and the determination data with each other.

Figure 2:
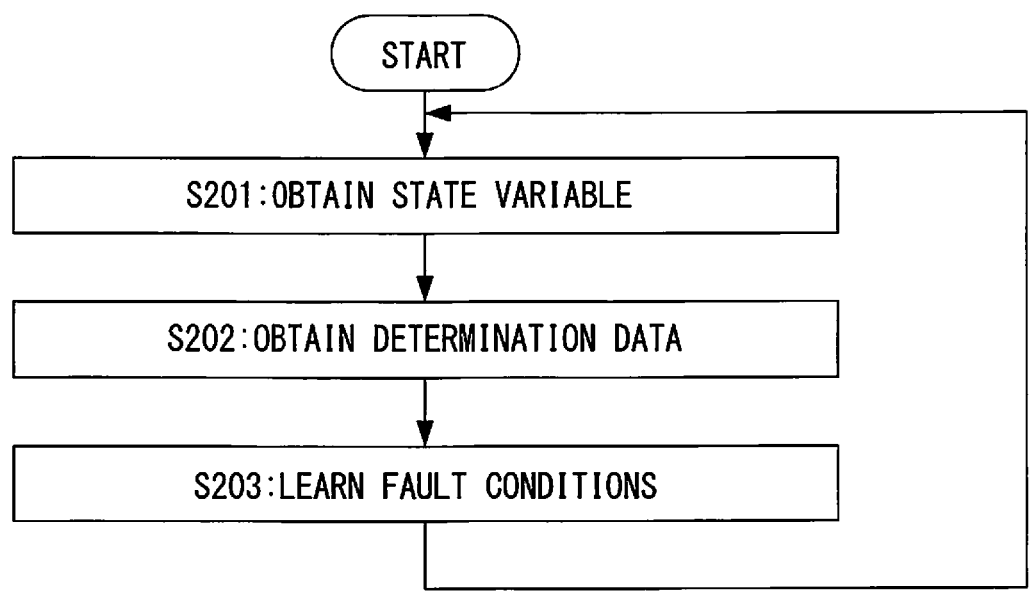
FIG. 2 is a flowchart illustrating an exemplary sequence of the learning process in a machine learning device.

An exemplary learning process in the machine learning device 5 will be described below with reference to FIG. 2. When learning is started, the state observation unit 52 obtains a state variable including, e.g., output data, internal data, or computational data in step S201. In step S202, the determination data obtaining unit 51 obtains determination data on the basis of the determination result obtained by the fault determination unit 31.

In step S203, the learning unit 53 learns fault conditions in accordance with a training data set generated based on a combination of the state variable obtained in step S201 and the determination data obtained in step S202. The processes in steps S201 to S203 are repeated until the machine learning device 5 satisfactorily learns fault conditions.

Figure 3:
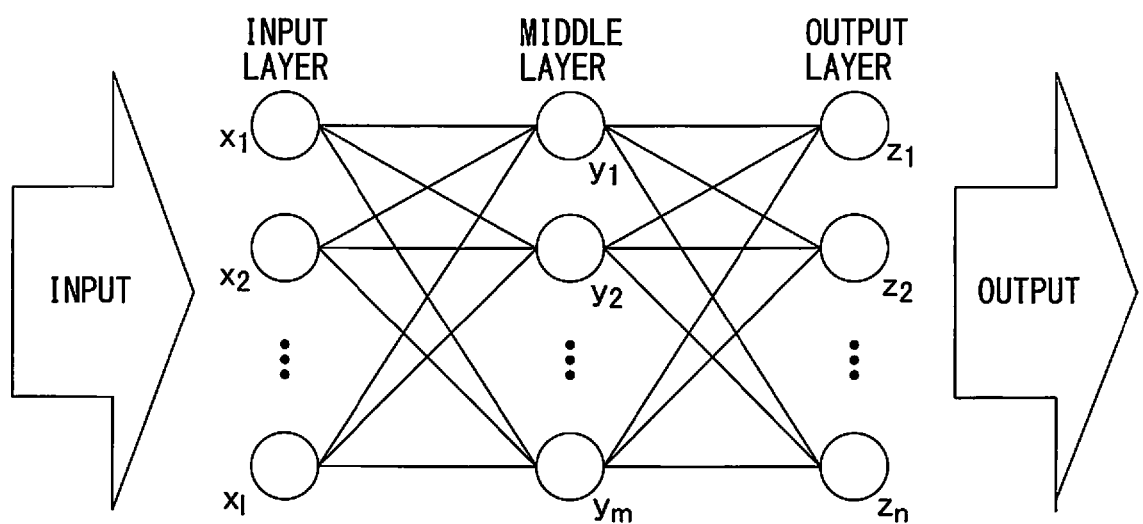
FIG. 3 is a diagram illustrating an exemplary configuration of a neural network.

In an embodiment, the learning unit 53 of the machine learning device 5 may learn fault conditions in accordance with a neural network model. FIG. 3 illustrates an exemplary neural network model. The neural network includes an input layer including 1 neurons $x_1, x_2, x_3, \ldots, x_l$, a middle layer (hidden layer) including m neurons $y_1, y_2, y_3, \ldots, y_m$, and an output layer including n neurons $z_1, z_2, z_3, \ldots, z_n$. Although FIG. 3 depicts only one middle layer, two or more middle layers may be formed. Although the machine learning device 5 (neural network) may use a general-purpose computer or processor, the use of, e.g., GPGPU (General-Purpose computing on Graphics Processing Units) or large-scale PC clusters allows higher-speed processing.

The neural network learns fault conditions associated with a fault of the robot 2. The neural network learns the relationship between the state variable observed by the state observation unit 52 and the occurrence of a fault, i.e., fault conditions, by so-called supervised learning, in accordance with a training data set generated based on a combination of this state variable and the determination data obtained by the determination data obtaining unit 51. In supervised learning, a large number of sets of data of certain inputs and results (labels) are fed into a machine learning device, which learns features observed in these data sets and inductively acquires a model for estimating the result from the input, i.e., their relationship.

Alternatively, the neural network may accumulate only state variables while no fault has occurred, i.e., while the robot 2 is in normal operation, to learn fault conditions by so-called unsupervised learning. When, for example, the rate of occurrence of a fault of the robot 2 is very low, unsupervised learning may be effective. In unsupervised learning, only input data are fed into a learning device in large amounts, which learns the distribution of the input data and learns a device which, e.g., compresses, classifies, and shapes the input data, without corresponding teacher output data being fed into the learning device. This allows, e.g., clustering of features seen in these data sets into similar features. The obtained result can be used to define certain criteria and allocate outputs in an optimizing manner according to the criteria, thus predicting an output. Intermediate problem setting between unsupervised learning and supervised learning, called semi-supervised learning, is also available. This applies when, for example, only some data serve as data sets of inputs and outputs and the remaining data include only inputs.

Figure 4:
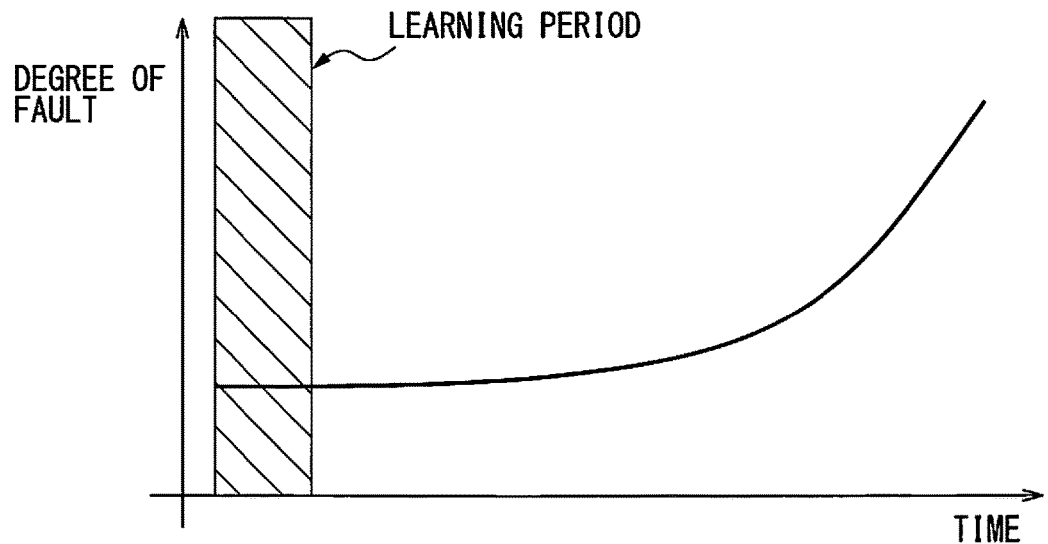
FIG. 4 is a graph for explaining an exemplary learning period in the unsupervised learning method.

FIG. 4 is a graph for explaining an exemplary learning period in an unsupervised learning method. The abscissa represents time (elapse of time) and the ordinate represents the degree of fault. In an unsupervised learning method as described above, a certain predetermined period, for example, several weeks, starting from immediately after shipment or maintenance of the robot 2 is established as a learning period. Only during this period, the state variable is updated and the resultant state is defined as being normal, as illustrated as FIG. 4. After that, the state variable is no longer updated and solely abnormality determination is performed, by outputting a "degree of fault" on the basis of the distance between the result output from the neural network and the normal model, thus achieving abnormality detection.

In this embodiment, since, for example, time-series data having a certain temporal correlation is modeled, the use of a neural network called the recurrent type is also effective. An RNN (Recurrent Neural Network) forms a learning model not exclusively using the state at the current time instant but using the internal states at the previous time instants, together. The recurrent neural network can be handled similarly to the general neural network, assuming the network expanded along the time axis. Although a variety of recurrent neural networks are available, a simple recurrent network (Elman Network) will be taken as an example below.

Figure 5:
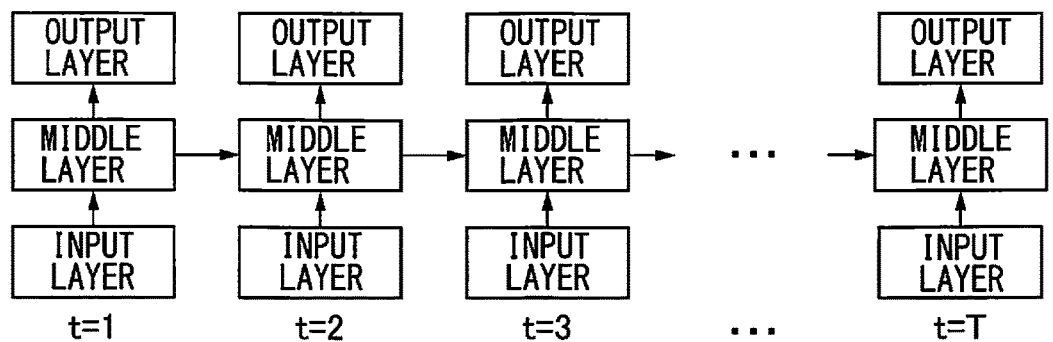
FIG. 5 illustrates views (a) and (b) for explaining an exemplary recurrent neural network.
Figure 5:
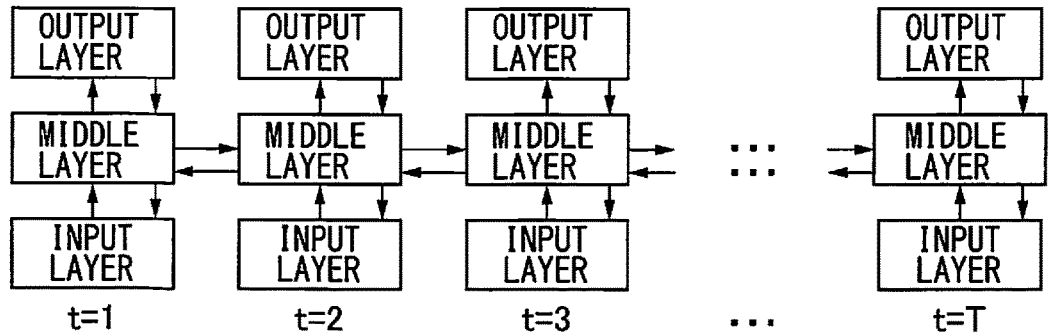

FIG. 5 illustrates views for explaining an exemplary recurrent neural network. FIG. 5 represents in (a), the time expansion of an Elman network, and in (b), the BPTT (Back Propagation Through Time) in the error backpropagation method. Backpropagation is applicable as long as an Elman network architecture, as depicted as (a) of FIG. 5, is used.

However, in the Elman network, unlike the normal neural network, the error propagates backwards in time, as depicted as (b) of FIG. 5. Such backpropagation is called the BPTT (Back Propagation Through Time). The use of such a neural network architecture allows estimation of a model for the output, based on the past input transition to use, for example, information indicating whether the estimated output value is equal to a predefined outlier, for the relationship with the occurrence of a fault.

In fault prediction (to be described later), the output layer outputs information indicating whether a fault has occurred or the "degree of fault" corresponding to the above-mentioned fault information in response to the state variable input to the input layer of the neural network. The "degree of fault" may have its maximum or minimum value limited or be a continuous or discrete quantity.

The machine learning device and the machine learning method according to the above-described embodiment can learn fault conditions according to the actual circumstances of use which are more accurate than fault conditions based on the determination data output from the determination data obtaining unit 51. This allows accurate fault prediction even when factors which may lead to faults are complicated and make it difficult to preset fault conditions.

In an embodiment, when the determination data obtaining unit 51 obtains determination data representing a fault of the robot 2, the learning unit 53 may update the fault conditions by weighting each determination data in accordance with the length of time from when this determination data is obtained until a fault occurs. The shorter the time from when determination data is obtained until a fault actually occurs, the closer the estimated state is to a state directly related to the occurrence of a fault. Therefore, fault conditions can be effectively learned by weighting the determination data in accordance with the time elapsed after a training data set is obtained.

In an embodiment, the learning unit 53 may learn fault conditions in accordance with training data sets generated for a plurality of robots 2. The learning unit 53 may obtain training data sets from a plurality of robots 2 used in the same location or learn fault conditions using training data sets collected from a plurality of robots 2 independently operating in different locations. A robot 2 may be added, in the course of data collection, to a group of robots from which a training data set is collected or, conversely, may be excluded from a group of robots from which a training data set is collected.

As methods for sharing training data sets for a plurality of robots 2, three examples will be given below, but other methods may be applicable, as a matter of course. First, a method for sharing the same model for a neural network is available, in which, for example, the difference between respective robots 2 is sent and reflected using a communication means, for each weighting factor of a network. Second, the weight of the machine learning device 5 and the like may be shared by sharing a data set of the input and output of a neural network. Third, a given database is provided and accessed to load a more appropriate model for a neural network to share the state (use similar models).

Figure 6:
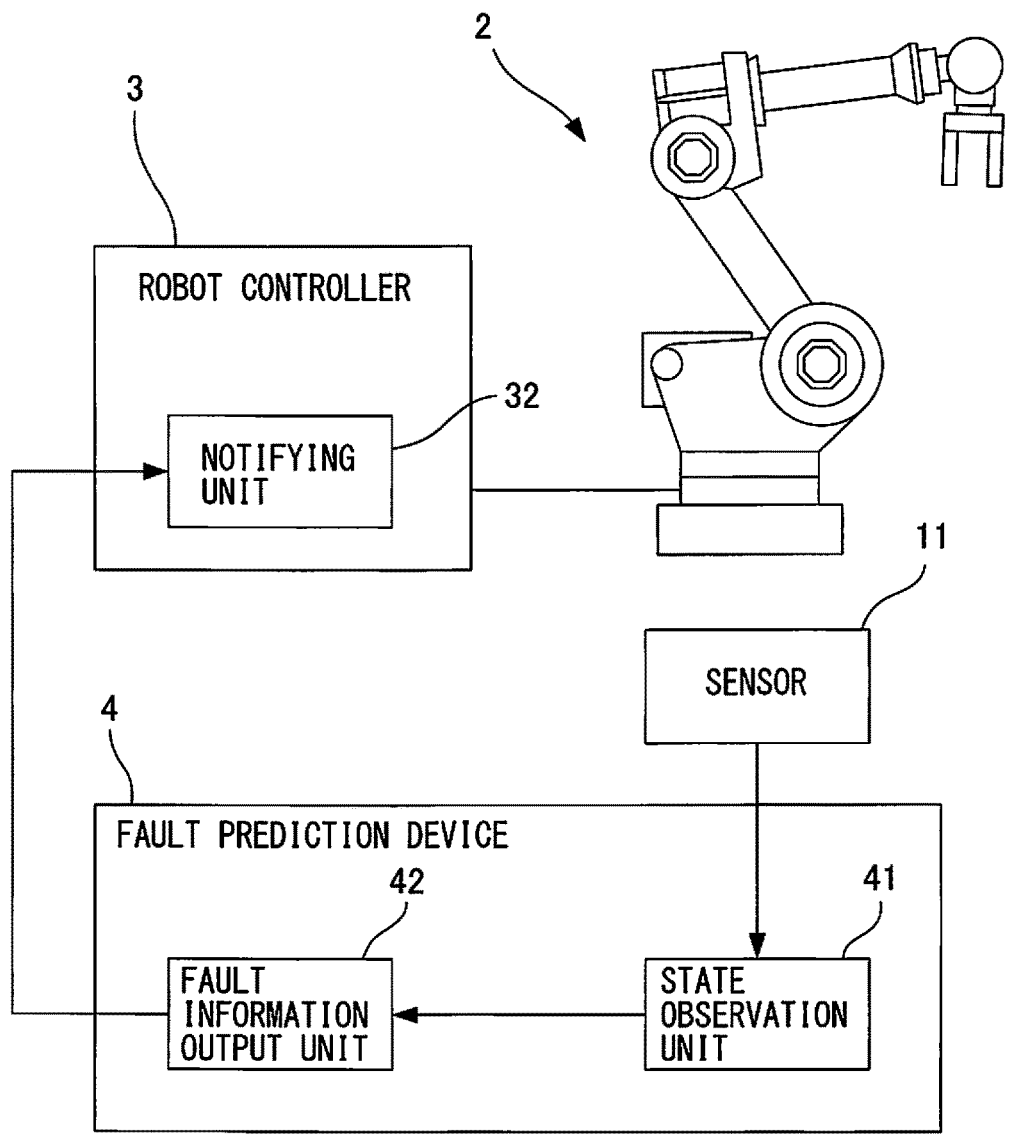
FIG. 6 is a block diagram illustrating an exemplary fault prediction system according to another embodiment.

FIG. 6 is a block diagram illustrating an exemplary fault prediction system according to another embodiment. A fault prediction system 1 includes a fault prediction device 4 which generates fault information for a robot 2, using the learning result obtained by a machine learning device 5.

The fault prediction device 4 includes a state observation unit 41 and a fault information output unit 42. The state observation unit 41 functions similarly to the state observation unit 52 described with reference to FIG. 1 and obtains a state variable reflecting the state of the robot 2 or the surrounding environment. The fault information output unit 42 outputs the fault information of the robot 2 in response to input of the state variable via the state observation unit 41, based on the result of learning by a learning unit 53 of the above-mentioned machine learning device 5 in accordance with a training data set.

A robot controller 3 can include a notifying unit (fault information notifying unit) 32, as depicted as FIG. 6. The notifying unit 32 notifies the operator of the fault information output from the fault information output unit 42. The mode in which the operator is notified of the fault information is not particularly limited as long as the fault information is identifiable to the operator. For example, information indicating whether a predicted fault has occurred or the degree of fault may be displayed on a display (not illustrated) or an alarm sound may be produced in accordance with the details of the fault information.

Figure 7:
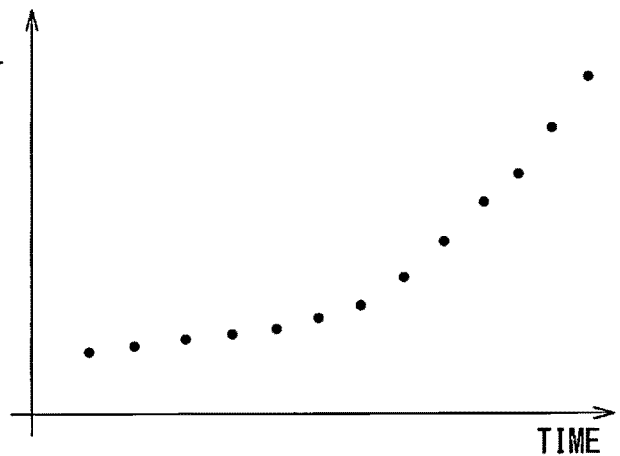
FIG. 7 illustrates graphs (a), (b) and (c) (type 1) for explaining exemplary index values representing the degrees of fault in the fault prediction system according to the embodiment.
Figure 7:
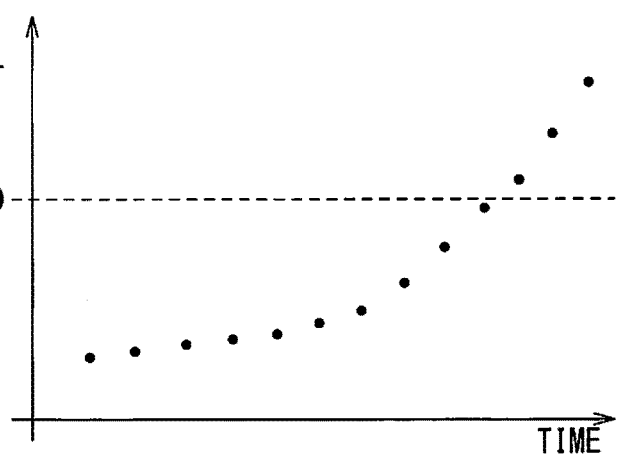
Figure 7:
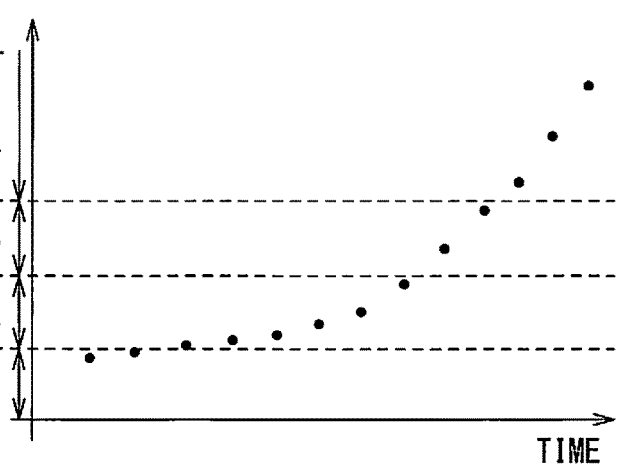
Figure 8:
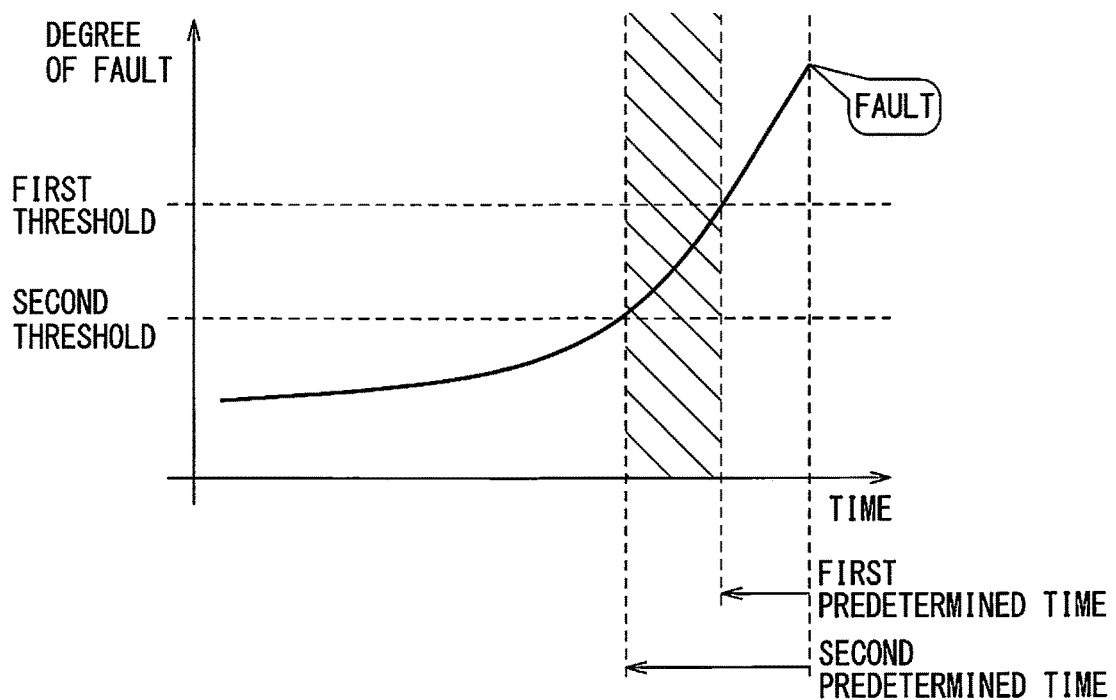
FIG. 8 is a graph (type 2) for explaining an exemplary index value representing the degree of fault in the fault prediction system according to the embodiment.

FIG. 7 and FIG. 8 are graphs for explaining exemplary index values representing the degrees of fault (first to fourth examples) in the fault prediction system according to the embodiment. Referring to (a), (b), and (c) of FIG. 7 and FIG. 8, the abscissa represents time and the ordinate represents the degree of fault. In, e.g., the first example, an index value representing the "degree of fault" may be set higher for a state closer to a fault, and the fault information output unit 42 can output the index value obtained by learning, directly as fault information, as illustrated as (a) of FIG. 7. In, e.g., the second example, a threshold may be set for the above-mentioned index value, and the fault information output unit 42 can output as fault information, information indicating whether a fault has occurred by defining a value equal to or larger than the threshold as being abnormal, and a value smaller than the threshold as being normal, as illustrated as (b) of FIG. 7. In, e.g., the third example, a plurality of thresholds (thresholds 1 to 3) may be set for the above-mentioned index value, and the fault information output unit 42 can output as fault information, threshold-specific levels (fault levels 1 to 4), as illustrated as (c) of FIG. 7.

In, e.g., the fourth example, a relation between the above-mentioned index value and the time until a fault occurs is obtained based on a plurality of data (teacher data) which lead to faults, and a first threshold for satisfying precedence to a time defined by a first predetermined period preceding the time at which a fault occurs is, in turn, obtained based on the obtained relationship, as illustrated as FIG. 8. A second threshold for satisfying subsequence to a time defined by a second predetermined period preceding the time at which a fault occurs is further determined. When at least one of the conditions that the index value is smaller than the first threshold and that the index value is equal to or larger than the second threshold is satisfied, the fault information output unit 42 may output as fault information the index value itself or a level of the index value, wherein the levels are created by separating the scale of the index value according to the thresholds. A threshold can be determined in this case to, for example, allow the past teacher data to satisfy all conditions, set a margin as appropriate, or even stochastically tolerate determination errors within a predetermined range of probability.

Figure 9:
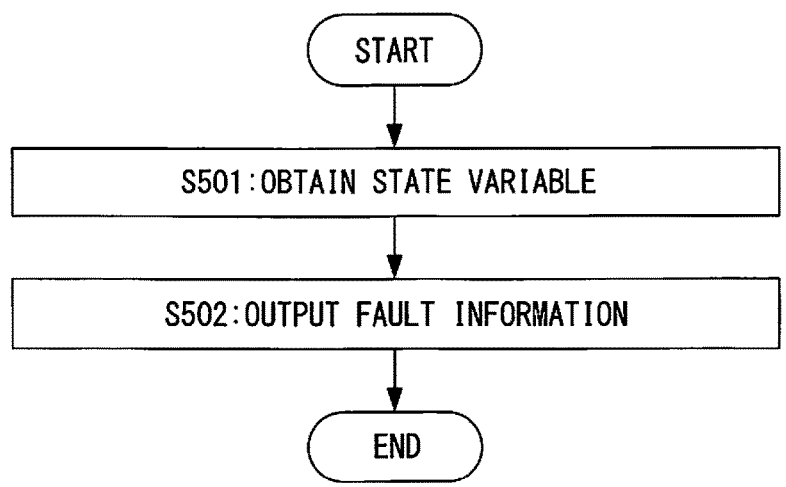
FIG. 9 is a flowchart illustrating an exemplary sequence of fault prediction which exploits a learning result.

Exemplary fault prediction performed using the learning result obtained by the machine learning device will be described below with reference to FIG. 9. In step S501, the state observation unit 41 obtains the current state variable including data output from, e.g., a sensor 11. In step S502, the fault information output unit 42 outputs fault information according to the state variable obtained in step S501, based on the above-mentioned learning result obtained by the machine learning device 5. When the fault prediction system 1 includes a notifying unit 32, the step of notifying the operator of fault information may be executed after step S502.

The fault prediction by the fault prediction device 4 described with reference to FIG. 9 may be performed when the robot 2 executes a specific operation determined in advance. Alternatively, the processes in steps S501 and S502 may be continuously executed in parallel while the robot 2 is in operation or at rest. Fault prediction may be periodically performed at predetermined time instants.

In an embodiment, the machine learning device 5 may execute machine learning in parallel with fault prediction by the fault prediction device 4. In this case, while the fault prediction device 4 generates fault information, the learning unit 53 of the machine learning device 5 learns fault conditions again, based on the determination data obtained by a fault determination unit 31 or via the operator operation, and the state variable at this point in time.

Although an embodiment in which machine learning is performed using a neural network has been described above, machine learning may be performed in accordance with other known methods such as genetic programming, functional logic programming, or support vector machine. Again, in this specification, an "industrial machine" refers to various machines including industrial robots, service robots, and machines controlled by CNC (Computer Numerical Control) devices, as described earlier.

The machine learning device and the machine learning method according to the present invention learn conditions associated with a fault of an industrial machine, in accordance with a training data set generated based on a combination of the state variable and the determination data. Since fault conditions are learned while actually operating the industrial machine, accurate fault conditions according to the actual circumstances of use are learned. In addition, since the fault prediction device and the fault prediction system according to the present invention include a machine learning device capable of machine learning of fault conditions, they achieve accurate fault prediction according to the actual circumstances of use.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A machine learning device configured to learn a condition associated with a fault of an industrial machine, the machine learning device comprising:
   a memory; and
   at least one processor coupled to the memory, the at least one processor being configured to:
      while the industrial machine is in operation or at rest, obtain a state variable including at least one of
         output data from a sensor configured to detect a state of one of the industrial machine and a surrounding environment,
         internal data of control software controlling the industrial machine, and
         computational data obtained based on one of the output data and the internal data;
      obtain determination data indicating a fault of the industrial machine, and
      learn the condition associated with the fault of the industrial machine in accordance with a training data set including a combination of the state variable and the determination data, wherein
   the fault of the industrial machine is predicted in accordance with the learned condition, and
   the at least one processor is further configured to update the condition by weighting each of the determination data comprised in the training data set, in accordance with a length of time from when each of the determination data is obtained until the fault actually occurs.

2. The machine learning device according to claim 1, wherein the at least one processor is further configured to learn the condition in accordance with the training data set generated for each of a plurality of industrial machines.

3. The machine learning device according to claim 1, wherein the at least one processor is further configured to learn a normal state only in a predetermined period and thereafter detect occurrence of the fault of the industrial machine.

4. A fault prediction device, comprising the machine learning device according to claim 1 and configured to predict the fault of the industrial machine, wherein
   the at least one processor is further configured to output fault information indicating one of whether the fault has occurred in the industrial machine and a degree of the fault, in response to input of a current state variable of the state variable, based on a result of learning by the at least one processor in accordance with the training data set.

5. The fault prediction device according to claim 4, wherein the at least one processor is further configured to learn a condition again in accordance with an additional training data set generated based on a combination of the current state variable and the determination data.

6. The fault prediction device according to claim 4, wherein
   the machine learning device is connected to the industrial machine via a network, and
   the at least one processor is configured to obtain the current state variable via the network.

7. The fault prediction device according to claim 6, wherein the machine learning device is located on a cloud server.

8. The fault prediction device according to claim 4, wherein the machine learning device is mounted in a controller that controls the industrial machine.

9. The fault prediction device according to claim 4, wherein the industrial machine comprises a plurality of industrial machines, and the learning result obtained by the machine learning device is shared by the plurality of industrial machines.

10. A fault prediction system, comprising:
the fault prediction device according to claim 4; and
the sensor configured to detect the state of said one of the industrial machine and the surrounding environment, and output the output data, wherein the at least one processor is further configured to notify an operator of the fault information.

11. The fault prediction system according to claim 10, wherein a time at which the at least one processor notifies the operator of the fault information satisfies at least one of
precedence to a time defined by a first predetermined period preceding a time at which a fault occurs, and
subsequence to a time defined by a second predetermined period preceding the time at which a fault occurs.

12. A machine learning method of learning a condition associated with a fault of an industrial machine, the method comprising:
while the industrial machine is in operation or at rest, obtaining a state variable including at least one of
output data from a sensor configured to detect a state of one of the industrial machine and a surrounding environment,
internal data of control software controlling the industrial machine, and
computational data obtained based on one of the output data and the internal data;
obtaining determination data indicating a fault of the industrial machine; and
learning the condition associated with the fault of the industrial machine in accordance with a training data set including a combination of the state variable and the determination data, wherein the fault of the industrial machine is predicted in accordance with the learned condition, and
the learning the condition associated with the fault of the industrial machine further comprises:
updating the condition by weighting each of the determination data comprised in the training data set, in accordance with a length of time from when each of the determination data is obtained until the fault actually occurs.

13. The machine learning method according to claim 12, wherein the learning the condition associated with the fault of the industrial machine further comprises learning the condition in accordance with the training data set generated for each of a plurality of industrial machines.

14. The machine learning method according to claim 12, wherein the learning the condition associated with the fault of the industrial machine further comprises learning a normal state only in a predetermined period and thereafter detecting occurrence of the fault of the industrial machine.

15. A fault prediction method, comprising:
the machine learning method according to claim 12; and
predicting the fault of the industrial machine, wherein
the predicting the fault of the industrial machine comprises outputting fault information indicating one of whether the fault has occurred in the industrial machine and a degree of the fault, in response to input of a current state variable of the state variable, based on a result of learning by the learning the condition associated with the fault of the industrial machine.

16. The fault prediction method according to claim 15, wherein the learning the condition associated with the fault of the industrial machine further comprises learning a condition again in accordance with an additional training data set generated based on a combination of the current state variable and the determination data.

17. The fault prediction method according to claim 15, wherein
the machine learning device is connected to the industrial machine via a network, and
the obtaining the state variable comprises obtaining the current state variable via the network.

* * * * *

UNITED STATES PATENT AND TRADEMARK OFFICE
CERTIFICATE OF CORRECTION

PATENT NO. : 10,317,853 B2
APPLICATION NO. : 15/220925
DATED : June 11, 2019
INVENTOR(S) : Shougo Inagaki et al.

Page 1 of 1

It is certified that error appears in the above-identified patent and that said Letters Patent is hereby corrected as shown below:

In the Claims

Column 10, Line 25, "a fault" should be changed to --the fault--.

Column 10, Line 31, "the fault" should be changed to --a fault--.

Column 11, Line 38, "a fault" should be changed to --the fault--.

Column 12, Line 1, "the fault" should be changed to --a fault--.

Signed and Sealed this
Twenty-seventh Day of October, 2020

Andrei Iancu
*Director of the United States Patent and Trademark Office*